United States Patent [19]

Kopineck et al.

[11] Patent Number: 4,759,046

[45] Date of Patent: Jul. 19, 1988

[54] APPARATUS FOR MEASURING THE THICKNESS PROFILE OF ROLLED STRIPS

[75] Inventors: Hermann-Josef Kopineck, Dortmund; Wolfgang Böttcher, Schwerte; Eduard Antpusat; Heiner Otten, both of Dortmund, all of Fed. Rep. of Germany

[73] Assignee: Hoesch Stahl Aktiengesellschaft, Dortmund, Fed. Rep. of Germany

[21] Appl. No.: 898,202

[22] Filed: Aug. 20, 1986

[30] Foreign Application Priority Data

Aug. 23, 1985 [DE] Fed. Rep. of Germany ....... 3530109

[51] Int. Cl.[4] ............................................. G01B 15/02
[52] U.S. Cl. ......................................... 378/54; 378/146
[58] Field of Search ....................... 378/10, 12, 19, 54, 378/56, 62, 146, 58, 207; 250/252.1

[56] References Cited

U.S. PATENT DOCUMENTS

| | | | |
|---|---|---|---|
| 3,790,799 | 2/1974 | Stein et al. | 378/146 |
| 3,866,047 | 2/1975 | Honnsfield | 378/18 |
| 4,047,036 | 9/1977 | Smith et al. | 378/56 |
| 4,132,895 | 1/1979 | Froggatt | 378/146 |
| 4,490,835 | 12/1984 | Wons | 378/146 |
| 4,517,460 | 5/1985 | Menlenbrugge et al. | 378/207 |

FOREIGN PATENT DOCUMENTS

| | | | |
|---|---|---|---|
| 0170778 | 2/1986 | European Pat. Off. | 378/54 |
| 3140714 | 9/1981 | Fed. Rep. of Germany | 378/54 |
| 3425295 | 7/1984 | Fed. Rep. of Germany | 378/54 |
| 2084829 | 4/1982 | United Kingdom | 378/160 |

OTHER PUBLICATIONS

Translation of German Patent Application No. P 3425295.
Translation of German Patent No. 3140714.

*Primary Examiner*—Craig E. Church
*Assistant Examiner*—John C. Freeman
*Attorney, Agent, or Firm*—Thomas S. Baker, Jr.

[57] ABSTRACT

To determine the thickness profile of rolled metal sheets by measuring the absorption of X-rays a slit diaphragm is used which is rotatable about the imaginary center axis of the X-ray tube, the rotation consisting of a reciprocating movement lying in a range of less than 36°. Between the reversal points of the rotation the rotational movement takes place in steps with rest intervals lying therebetween.

10 Claims, 4 Drawing Sheets

APPARATUS FOR MEASURING THE THICKNESS PROFILE OF ROLLED STRIPS

The invention relates to an apparatus for measuring the thickness profile of rolled metal sheets and sheet strips comprising an X-ray tube, a movable slit diaphragm lying closely in front of said tube and radiation receivers which are spaced in front of said diaphragm and fixedly installed along a line and aligned with the radiation, the sheet or sheet strip to be measured being moved through the radiation between the X-ray tube or slit diaphragm and the radiation receivers in such a manner that its width extends along the line of the fixedly installed radiation receivers, and connected to the radiation receivers and a displacement sensor of the slit position is a processing unit for determining the radiation absorption and the association with the thicknesses of the sheet strip and the measuring points or measuring regions distributed over the width of the sheet strip, said unit being connected to a display device.

An apparatus for thickness profile measurement is known from German patent application No. 3,140,714. This apparatus has the disadvantage that only relatively inaccurate measurements can be carried out. Due to the size of the receivers it is not possible to divide the sheet metal strip to be measured into narrow regions between which no regions which are not measured lie. A further disadvantage is that the number of radiation receivers used is very high and this makes the apparatus complicated and expensive.

U.S. Pat. No. 3,866,047 discloses a further apparatus which overcomes these disadvantages by operating with wide radiation receivers and a moving slit diaphragm.

This construction has the disadvantage that no narrow measuring regions can be achieved because they would require very narrow slits in the slit diaphragm. The linear movement of the slit diaphragm in conjunction with narrow slits would mean that in the vicinity of the reversal points of the movement no radiation would pass through the slits. The centre axis of the slit would coincide with the beam direction, enabling the full radiation to pass through the slit, only exactly in the centre of the movement of the slit diaphragm. This error can be eliminated adequately only if the slit diaphragm has a relatively large distance from the radiation source, is made relatively long and with relatively wide slits. Such a slit diaphragm has a large mass and for that reason only a few measured values per second can be determined because the slit diaphragm can be oscillated only very slowly. This large mass also causes vibratory motions of the entire frame and as a result in particular with relatively large distances between the radiation source and the radiation receiver narrow measuring ranges are not possible. GB patent No. 2,084,829 also discloses a rotating slit diaphragm which does not cause any vibrations. With this slit diaphragm the distance between the radiation source and the slit diaphragm must once again be relatively large and this also leads to inadequate local resolution.

A rotating slit diaphragm lying closely in front of the radiation source and having extremely narrow slits is described in German patent application No. P 34 25 295. In this case, due to the rotation movement of the slit diaphragm led round the radiation source the centre axis of each slit always coincides with the beam direction. The apparatus according to No. P 34 25 295 thus has the necessary high local resolution necessary for use in rolling mills. A disadvantage resides in the large number of slits of which only about one tenth is used and traversed at any instant. The extremely accurate production of the narrow slits is very expensive. A further disadvantage resides in that small errors are inevitable in the slit production. With the large distances to the radiation receivers small errors manifest themselves to such an extent that they have to be taken into account in the evaluation by a correction factor.

In the practical construction 150 slits of about 1 mm width are necessary for the slit diaphragm and the series of radiation receivers includes 14 radiation receivers so that 150 times 14 correction factors arise and taking these into account involves a great deal of computing expenditure in the processing unit. A further disadvantage resides in that with the rough rolling milling conditions and the necessary extremely accurate measurements the apparatus must be recalibrated very frequently and then each correction factor must be redetermined.

The present invention is based on the problem of providing an apparatus for measuring the thickness profile of rolled metal strips while retaining a high local resolution of the measurements makes do with a slit diaphragm which is easy to make and a small processing unit which is easy to calibrate and in which moreover the measurement results are measured at an exact constant distance from the edge of the strip.

The slit diaphragm need only be reciprocated through the extremely small rotation of less than 5° because it is mounted as close as possible to the X-ray tube and at the same time the radiation receivers are disposed relatively remotely from the X-ray tube and the slit diaphragm is provided with a relatively large number of slits.

The overall length of the slit diaphragm, due to the closeness to the X-ray tube, is relatively short and its mass is thus small. Due to the small rotation of less than 5° only a relatively small angular velocity is required. As a result only small forces of inertia occur at the reversal points of the movement. The small forces of inertia can be taken up by the support means of the apparatus without any mass balancing whatever without disturbing vibrations making themselves felt. It is of course also possible to provide a mass compensation in the form of a mass which is moved opposite to the direction of rotation of the slit diaphragm and the movement of which is derived by a gear reversing the direction of rotation for example from the movement of the slit diaphragm.

The magnitude of the rotation movement may be still further reduced if the number of slits in the slit diaphragm is increased. It is expedient for a slit to be provided in the slit diaphragm for each radiation receiver. The rotation range of a slit may also extend over two or more radiation receivers.

The thickness of narrow strips of the metal strip lying exactly in the strip travelling direction is measured if the rotation of the slit diaphragm takes place in steps with intermediate residence times in which the slit diaphragm is stationary and the measured value pickup of the processing unit is switched on during the residence time between two steps of the slit diaphragm.

The switching on and off of the measured value pickup is by a switch or a contactless-switching switching element which are attached to the drive of the slit diaphragm, preferably on a shaft which rotates exactly one revolution per step of the slit diaphragm. The switch may for example be actuated by a suitably shaped cam mounted on the shaft or contactless by for example reflected light beams in known manner.

It is expedient for the rotation of the slit diaphragm to be only of a magnitude such that the beam sweeps over less than 95% of the effective length of the radiation receiver and at the edges of the radiation receiver narrow regions are omitted. These narrow regions serve as compensating reserve if during operation for example due to thermal expansions small location differences occur between the slit diaphragm and the radiation receivers. In this manner it is ensured that the first and last measuring region always lie entirely on the radiation receiver.

Another possibility of compensating small position differences is obtained if the start of the first measuring region in the passage of a radiation receiver begins in the small intermediate space inoperative for radiation between the radiation receivers and the measured value of the first measuring region is taken into account by a corresponding correction factor for the radiation falling into the ineffective intermediate space. It is favourable for this correction factor to be redetermined as often as possible, for example after every strip passage, by a calibrating measurement. It should however be redetermined at the latest every 2 hours. If the intermediate space is for example 6 mm wide position differences effecting a deviation of the beam up to 6 mm from the desired position can be compensated.

The slit diaphgram has the form of a small segment of a circular ring. It is fully sufficient for the slit diaphragm to be restricted to the tenth of a circle and into the slit diaphragm at equal distances apart 15 narrow slits are formed which extend radially in the direction to the imaginary centre point of the circular ring. The imaginary centre axis of the X-ray tube represents the axis of rotation of the circular ring. The beam passing through a slit strikes the radiation receiver associated with said slit about 2 m distance away from the slit diaphragm; said receiver can have a length of about 15 cm. The receiprocating movement of the beam takes place only over the 15 cm length of the radiation receiver. The adjacent beam of the adjacent slit scans the adjacent radiation receiver. The reciprocating rotational movement of the slit diaphragm is over an angle which is less than 3°.

When the strip to be measured is disposed such that the edge of the strip lies within a measuring region this measuring region cannot be used for the thickness profile determination. It is then advantageous if in the processing unit the measured value evaluation is connected so that for the thickness profile determination the measured value lying at the start of the passage after the last measured value showing no absorption is suppressed and likewise the measured value which towards the end of the passage lies before the first value showing no absorption is also suppressed.

The calibration of the apparatus is carried out during the operation in the short pauses between strip passages by making a measurement without a strip to be measured being located in the apparatus and calculating a mean value from the measured values of the radiation receivers and providing each individual measured value of a measuring region with a correction factor in such a manner that the product measured value times correction value gives the mean value and storing the correction factors thus formed in the processing unit and employing them for processing the measured values obtained when a strip is traversed by the radiation.

An example of embodiment will be explained in detail with the aid of FIGS. 1 to 4.

In the Figures.

Figure 1:
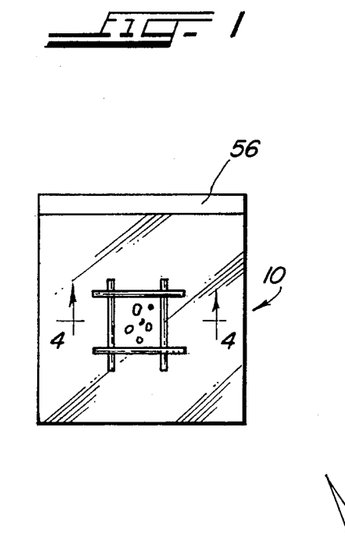
FIG. 1 shows the apparatus with the X-ray tube and the slit diaphragm and the radiation receivers and FIG. 2 shows a switch controlled by a cam and FIG. 3 is a general view of the devices following the radiation receivers and FIG. 4 shows a slit diaphragm.

The X-ray tube 11 is annularly surrounded by the shield 12. The shield 12 has a window 13 through which a beam 14 is sent in the direction towards the radiation receivers 15-29. The radiation receivers 15-29 are arranged on a circular line whose centre point coincides with the centre 30 of the X-ray tube. In front of the window 13 there is the slit diaphragm 31 which is reciprocated in both directions of rotation by less than 3° about the centre 30 of the X-ray tube 11.

Secured to the slit diaphragm 31 is a stirrup member 32 which is mounted at the points 70 to 73 by for example rollers. The drive of the slit diaphragm 31 for the reciprocating pivot movement is effected by the motor 33 which may for example be a three-phase motor. The speed of rotation of the motor 33 is reduced in the gearing 34 and the stepping gearing 35 is driven with the reduced speed.

The stepping gearing 35 divides the continuous rotary motion into a stepwise rotary motion. Every rotation lasting 60 milliseconds is followed by a stationary period of 70 milliseconds. This is effected in known manner within the stepping gearing by for example a suitably formed cam. The pendulum gearing 36 is driven by the stepping gearing 35. In said pendulum gearing the rotary motion is converted in a manner known per se to a pendulum motion which is transmitted via the lever 37, the rod 38 and the lever 39 connected to the stirrup member 32 to the slit diaphragm 31. By the pendulum gearing 36 a movement reversal is achieved after every 14 steps of the stepping gearing 35. The radiation receivers 15-29 in one example of embodiment are 150 mm long and arranged on a circle beneath the strip 40 to be investigated between two rollers of an exit roller table of a rolling mill, which is not shown, such that they all have the same distance from the centre point 30 of the X-ray tube 11.

The X-ray tube is arranged above the exit roller table. The ratios in the gearings are matched so that the shaft 41 executes exactly one revolution whilst the slit diaphragm advances by one step and stops between the steps. A switch 43 is disposed above a cam 42 which is secured to the shaft 41. Said cam switches the switch 43 on for example during one half of the revolution and off during the other half. Said switch 43 may be mechanically actuated but may also have contactless actuation for example with the aid of an interrupted light beam when for example the upper part of the cam in FIG. 2 interrupts the light beam of a light barrier and the lower part with lesser radius allows the light beam to pass, thus initiating the switching functions. The switch 43 is set such that a switching takes place at every start and end of the rest intervals between the steps of the stepping gearing 35. This switching information of the switch 43 is passed via the line 44 to a displacement pickup.

The displacement pickup is connected to each of the radiation receivers 15–29 via in each case an amplifier 68. The output of the displacement pickup 45 is connected to a step counter disposed in the processing unit 46 whose output is in turn connected to the display device 69.

The switch 43 effects by its signal passing via the displacement pickup 45 to the processing unit 46 that all measurement signals coming from the radiation receivers 15 to 29 during the movement of the slit diaphragm 31 are suppressed and only the measurement signals arriving in the rest intervals between the steps are processed.

Figure 3:
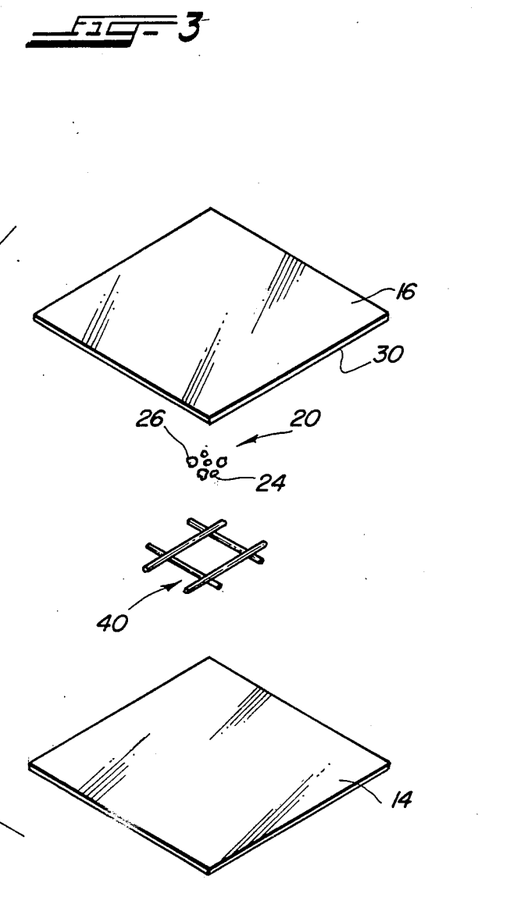

The radiation receiver 15 illustrated in FIG. 3 comprises 14 measuring regions which are shown in dashed line and designated by 47 to 61. The first measuring regions of the radiation receiver 16 adjacent the former receiver are designated by 62 to 65 a.

In FIG. 3 the beam 66 allowed to pass by the slit diaphragm 31 is located in the measuring region 51 whilst the following slit of the slit diaphragm allows a beam 67 to pass onto the measuring region 65 a of the following radiation receiver 16.

When the slit diaphragm 31 is turned by the motor 33 and the interposed gearings the beam 66 passes through the measuring regions from the radiation receiver 15 in the direction to the radiation receiver 16 and back again in 0.5 to 4 seconds. If the beam 66 for example is on the measuring region 51 during the interval between the steps the beam is weakened corresponding to the thickness of the strip 40 to be traversed. In the radiation receiver 15 a current depending on the intensity of the beam 66 is generated. This current flows via the amplifier 68 to the displacement pickup 45 in the processing unit 46 where it is processed to give a quantity corresponding to the thickness of the strip 40. This measured quantity is passed onto the display device. In addition to the display device other devices may also be connected, for example for correcting the rolling process.

Figure 2:
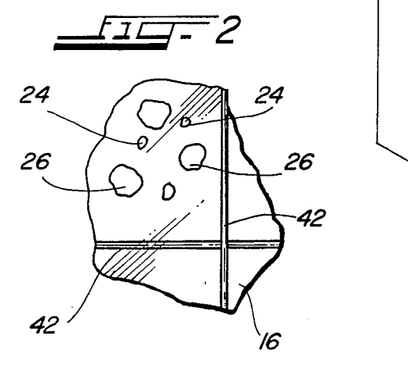

The switch 43 effects in its for example interrupted position by its connection to the processing unit that all measurement signals coming from the radiation receivers 15–29 are suppressed when for example during a half revolution of the shaft 41 the slit diaphragm 31 is advanced by one step.

The measurement signals are not processed again until in the other half of the revolution of the shaft 41 the switch moves into the closed position.

In the displacement pickup 45 the number of current interruptions of the switch 43 is counted. The amplifier 68 superimposes on the output current a recognition signal differing from the recognition signals of the other amplifiers which are connected after the other radiation receivers. From the recognition signal the displacement pickup 45 recognises to which radiation receiver the quantity is to be assigned and from the counted number of interruptions of the switch 43 the displacement pickup recognises in which measuring region of the respective radiation receiver the beam is located at that instant.

The displacement pickup 45 passes the measured quantity together with a signal associated with each measuring region to the processing unit 46. The latter is essentially a programmed computer which in a manner known per se calculates from the measured intensity of the received beam the thickness of the strip 40, also making corrections for disturbing influences. Account is taken and a correction made for example for the fact that the intensity distribution of the X-ray tube is not uniform over the width of the radiation window. A correction can also be made for the varying sensitivity over the width of the radiation receiver. The values of the individual measuring regions can be supplied to a display device 69 whose screen is also divided into an equal number of measuring regions. A narrow strip on the screen of the display device 69 corresponds in analog manner and in position to each of the measuring regions 47 to 61. These strips are indicated in dashed line. The values of the thickness of the strip 40 may be displayed digitally but they may also be represented as dots on the screen, the vertical position of the dots corresponding to the magnitude of the thickness. The dots may also be connected to form a curve. Any other desired display device can also be connected.

In the displacement generating means or pickup 45 in the example of embodiment after every 14th step the counting for the assignment of the measuring regions is restarted.

Suitable radiation receivers are for example plastic scintillators which are followed in known manner by photomultipliers and amplifiers or counting means.

The slit diaphragm (31) includes more than 6 slits and is connected to a gearing continuously reversing the direction of rotation and the maximum rotation angle between the reversal points is less than 8° and the distance from the centre of the slit diaphragm to the imaginary axis of rotation is less than $\frac{1}{3}$ of the distance from the center radiation receiver to the imaginary rotation axis of the slit diaphram.

Figure 4:
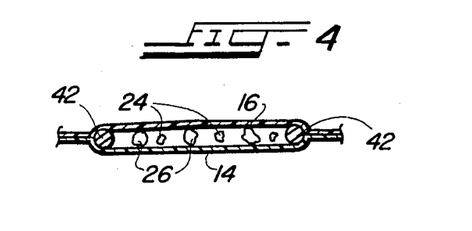

In the example given the distance from the centre 30 of the X-ray tube 11 to the radiation receivers 15 to 29 is 3820 mm. The distance from the strip to the centre radiation receiver is 1200 mm. The distance from the centre of the slit diaphragm 31 to the centre 30 of the X-ray tube 11 is 530 mm. The slit diaphragm 31 has a thickness in the beam direction of 180 mm. In the slit diaphragm 31 15 slits are disposed. Each slit is 1.2 mm wide and is spaced from the next slit a distance of about 21 mm. In the example given the two major boundary faces of the slits are plane-parallel. A still greater accuracy would be achieved if these boundary faces were somewhat wedge-shaped with respect to each other corresponding to the beam direction. The apparatus is able to measure thickness fluctuations of the strip down to less than 2 per mil.

An exact strip edge determination is effected for example if in accordance with FIG. 3 the beam 66 first meets the measuring region 47 of the radiation receiver 15. In this position there is no absorption. In the next measuring region 48 partial absorption occurs. In the measuring region 49 and the following measuring regions full absorption occurs. If for example the measuring region 48 gives a measured value whose difference to the measured value of the measuring region 47 is for example 40% of the difference of the measured values of the measuring regions 47 and 49, the strip edge lies 40% of the width of the measuring region to the right from the measuring region 47. If the difference is for examle 30% the distance is 30% of the width to the right. This distance is counted from the right side of the measuring region 47 to the right in the direction towards the measuring region 49. The storing of the measured values, formation of the difference of the measured values and calculation of the resulting position of the strip edge is carried out in a manner known per se in the processing unit 46, which includes a computer.

We claim:

1. Apparatus for measuring the thickness profile of rolled metal sheets and sheet strips (40) comprising an X-ray tube (11), said tube providing a source of radiation, a movable slit diaphragm (31) lying closely in front of said tube, radiation reoeivers (15-29) having a plurality of measuring regions being spaced in front of said diaphragm and fixedly installed along a line and aligned with the radiation emitted from said tube (11), said slit diaphragm having a plurality of slits (47-61), the sheet strip (40) to be measured being moved through the radiation between the diaphragm (31) and the radiation receivers (15-29) in such a manner that its width extends along the line of the fixedly installed radiation receivers (15-29), a processing unit (46) connected to the radiation receivers and to a displacement sensor (45) of the slit position for determining the radiation absorption and the thickness of the sheet strip (40) wherein the measuring regions (47) of said radiation receivers are distributed over the width of the sheet strip (40), said unit (46) including a measured value pickup having means to operate said value pickup when said slit diaphragm is at rest and being connected to a display device (69), characterized in that the slit diaphragm (31) being rotatable about the center axis of the X-ray tube (11) is connected to the output of a drive generating a stepwise pendulum rotary motion from the rotary motion of a driving motor to provide alternating periods of rest and movement for said slit diaphragm, said drive for said slit diaphragm consisting of a driving motor (33) with reduction gearing (34), a mechanical stepping gearing (35) attached to said reduction gearing, and a mechanical pendulum gearing (36) connected to said stepping gearing.

2. Apparatus according to claim 1, characterized in that the number of slits in said slit diaphragm corresponds to the number of radiation receivers (15-29) and each radiation receiver (15-29) is swept over substantially its entire length by one of the beams (66) passing through the slits, and the rotation of said slit diaphragm amounting to less than one tenth of a revolution.

3. Apparatus according to claim 1, characterized in that attached to the drive is said means to operate said value pickup, which comprises a switching element which is switched on and off by the rotation of a shaft (41) of the drive (34) and wherein said switching element is connected to a displacement sensor (45) and a member of the processing unit (46) to switch the measured value pickup on when said slit diaphragm is stationary and off when said slit diaphragm is moving.

4. Apparatus according to claim 3, characterized in that the shaft (41) operates the switch (43) such that every step including the time the slit diaphragm is stationary (31) corresponds exactly to one revolution of said shaft (41).

5. Apparatus according to claim 3, characterized by means for actuating the measured value pickup of the processing unit (46) on during the time the slit diaphragm (31) is stationary.

6. Apparatus according to claim 3, characterized in that the displacement saensor (45) is connected to each individual radiation receiver (15-29) and to a step counter disposed in the processing unit (46).

7. Apparatus according to claim 1, characterized by means for limiting the partial rotation of the slit diaphragm (31) such that the beam (66) passing through an associated slit sweeps over less than 95% of the length of each radiation receiver (15).

8. Apparatus according to claim 1, characterized in that the slit diaphragm (31) includes more than 6 slits and is connected to a gearing continuously reversing the direction of rotation, where the maximum rotation angle of said diaphragm is less than 8° and the distance from the slit diaphragm to its axis of rotation is less than ⅓ of the distance from a centre radiation receiver to the rotation axis of the slit diaphragm.

9. Apparatus aaccording to claim 1, characterized that the speed of rotation of said slit diaphragm is such that its rotational angle is covered in 0.5 to 4 sec.

10. Apparatus according to claim 1, characterized in that the radiaton receivers are arranged along a circularly curved line whose rotational axis coincides with the rotation axis of the slit diaphragm (31).

* * * * *

UNITED STATES PATENT AND TRADEMARK OFFICE
CERTIFICATE OF CORRECTION

PATENT NO. : 4,759,046

DATED : July 19, 1988

INVENTOR(S) : Hermann-Josef Kopineck et al.

It is certified that error appears in the above-identified patent and that said Letters Patent is hereby corrected as shown below:

The title page should be deleted to appear as per attached title page.

Figures 1 - 4 of the drawing should be deleted to appear as per attached sheets.

Signed and Sealed this

Eighth Day of November, 1988

Attest:

DONALD J. QUIGG

*Attesting Officer*    *Commissioner of Patents and Trademarks*

United States Patent [19]

Kopineck et al.

[11] Patent Number: 4,759,046
[45] Date of Patent: Jul. 19, 1988

[54] APPARATUS FOR MEASURING THE THICKNESS PROFILE OF ROLLED STRIPS

[75] Inventors: Hermann-Josef Kopineck, Dortmund; Wolfgang Böttcher, Schwerte; Eduard Antpusat; Heiner Otten, both of Dortmund, all of Fed. Rep. of Germany

[73] Assignee: Hoesch Stahl Aktiengesellschaft, Dortmund, Fed. Rep. of Germany

[21] Appl. No.: 898,202

[22] Filed: Aug. 20, 1986

[30] Foreign Application Priority Data

Aug. 23, 1985 [DE] Fed. Rep. of Germany ....... 3530109

[51] Int. Cl.⁴ .................................................. G01B 15/02
[52] U.S. Cl. ........................................ 378/54; 378/146
[58] Field of Search ................ 378/10, 12, 19, 54, 378/56, 62, 146, 58, 207; 250/252.1

[56] References Cited

U.S. PATENT DOCUMENTS

| 3,790,799 | 2/1974 | Stein et al. | 378/146 |
| 3,866,047 | 2/1975 | Honnsfield | 378/18 |
| 4,047,036 | 9/1977 | Smith et al. | 378/56 |
| 4,132,895 | 1/1979 | Froggatt | 378/146 |
| 4,490,835 | 12/1984 | Wons | 378/146 |
| 4,517,460 | 5/1985 | Menlenbrugge et al. | 378/207 |

FOREIGN PATENT DOCUMENTS

| 0170778 | 2/1986 | European Pat. Off. | 378/54 |
| 3140714 | 9/1981 | Fed. Rep. of Germany | 378/54 |
| 3425295 | 7/1984 | Fed. Rep. of Germany | 378/54 |
| 2084829 | 4/1982 | United Kingdom | 378/160 |

OTHER PUBLICATIONS

Translation of German Patent Application No. P 3425295.
Translation of German Patent No. 3140714.

Primary Examiner—Craig E. Church
Assistant Examiner—John C. Freeman
Attorney, Agent, or Firm—Thomas S. Baker, Jr.

[57] ABSTRACT

To determine the thickness profile of rolled metal sheets by measuring the absorption of X-rays a slit diaphragm is used which is rotatable about the imaginary center axis of the X-ray tube, the rotation consisting of a reciprocating movement lying in a range of less than 36°. Between the reversal points of the rotation the rotational movement takes place in steps with rest intervals lying therebetween.

10 Claims, 4 Drawing Sheets